United States Patent [19]

Walters et al.

[11] Patent Number: 4,960,631
[45] Date of Patent: Oct. 2, 1990

[54] MOISTURE SEAL FOR AIRCRAFT WINDOWS

[75] Inventors: Patricia B. Walters, Harvest; David C. Allen, Huntsville, both of Ala.

[73] Assignee: PPG Industries, Inc., Pittsburgh, Pa.

[21] Appl. No.: 292,042

[22] Filed: Dec. 30, 1988

[51] Int. Cl.$^5$ .................. B32B 27/38; B32B 17/06; B32B 17/10

[52] U.S. Cl. .................. 428/192; 428/412; 428/413; 428/417; 428/424.4; 428/425.6; 428/426; 428/429; 428/437; 428/451; 428/501; 52/789; 296/84.1

[58] Field of Search .............. 52/789, 308, 784, 397, 52/398; 156/102, 104, 106, 107, 108, 330; 428/192, 412, 413, 417, 426, 429, 437, 425.6, 451, 424.4, 501; 296/84.1

[56] References Cited

U.S. PATENT DOCUMENTS

| | | |
|---|---|---|
| 3,791,910 | 2/1974 | Bowser .................. 428/34 |
| 3,931,113 | 1/1976 | Seeger et al. . |
| 4,046,951 | 9/1977 | Stefanik . |
| 4,121,014 | 10/1978 | Shaffer . |
| 4,204,374 | 5/1980 | Olson . |
| 4,277,294 | 7/1981 | Orcutt . |
| 4,284,677 | 8/1981 | Herliczek . |
| 4,321,777 | 3/1982 | Sauret et al. .................. 52/308 |
| 4,324,373 | 4/1982 | Zibritosky . |

OTHER PUBLICATIONS

B. F. Goodrich Product Bulletin for PLASTILOCK® 435 Sealant.
Product Data Sheet, B. F. Goodrich, PLASTILOCK® 425 Thixotropic, Low Gravity Sealant.

Primary Examiner—Ellis P. Robinson
Assistant Examiner—Amy Hulina
Attorney, Agent, or Firm—Andrew C. Siminerio

[57] ABSTRACT

A laminated transparency includes a flexible epoxy moisture seal about the periphery of the transparency. The edge of the transparency may be cleaned and primed with a silane surface treatment.

15 Claims, 1 Drawing Sheet

MOISTURE SEAL FOR AIRCRAFT WINDOWS

BACKGROUND OF THE INVENTION

1. Field of the Invention

This invention relates to a laminated transparency and more particularly to a moisture seal for an aircraft windshield to prevent delamination of the windshield plies due to moisture absorbed by the windshield interlayers.

2a. Technical Considerations

Aircraft transparencies are typically a laminated assembly including a plurality of interlayer material plies interposed between transparent rigid plies. The rigid plies can be glass or any other well known substitute such as polycarbonates, acrylic resins, polyesters, and rigid transparent polyurethanes. The thermoplastic interlayers, which bond adjacent rigid plies together to form a unified laminated assembly, may be a material such as polyvinyl butyral, silicone, or urethane. When exposed to moisture over a period of time, these interlayer materials have been observed to lose their adhesive properties and cause degradation of the bond between the rigid plies resulting in reduced strength and possible delamination of the transparency. In order to prevent the penetration of moisture into the interlayer from the periphery of the transparency, a moisture seal is applied along the edge of the transparency or along any other portion of the transparency where the interlayer material is exposed to moisture. Besides sealing the interlayer material from moisture, the sealing material must also by flexible at the low temperatures to which the aircraft transparency is exposed so as not to crack the seal or transparency or pull of any edge chips from the periphery of the transparency. In addition, depending on the application, the sealing material must also be able to maintain its moisture sealing properties under prolonged exposure to ultraviolet radiation which can degrade a sealant material.

2b. Patents of Interest

U.S. Pat. No. 4,046,951 to Stefanik teaches a laminated transparency with a composite edge sealing arrangement consisting essentially of a thin barrier layer of an organofluoro composition and a sealant layer having moisture resistant properties that will bond to the lamina of the transparency and the barrier layer.

U.S. Pat. No. 4,121,014 to Shaffer teaches a transparent laminate with a plasticized polyvinyl acetal ply secured to a polycarbonate ply by an adhesive film of polyurethane or epoxy resin.

U.S. Pat. No. 4,204,374 to Olson teaches an edge design for an impact resistant windshield. A bevel on the surface of the outboard ply about the windshield's perimeter is filled with a flexible sealant such as polyurethane, polysulfide, silicone, or the like to protect against delamination.

U.S. Pat. No. 4,277,294 to Orcutt and 4,324,373 to Zibritosky teach a laminated window panel having a silicone bumper strip about its periphery to provide a barrier against moisture penetrating the interlayer material.

U.S. Pat. No. 4,284,677 to Herliczek teaches a glazing unit which uses polyvinyl butyral as interlayer material and an edge seal in a glass laminate.

SUMMARY OF THE INVENTION

The present invention provides a moisture resistant edge seal for a laminated transparency. The seal is a flexible epoxy and is particularly useful in transparencies having urethane interlayer material. In one particular embodiment of the invention, the epoxy is a thixotropic, two-part, lightweight room temperature curing epoxy sealant. A primer, such as a silane material, may be used to treat the edge surface.

DETAILED DESCRIPTION OF THE INVENTION

The present invention is shown in conjunction with its use as an edge seal for an aircraft transparency but it should be understood that the invention may be used in any type of laminated transparency where it is critical to maintain a moisture resistant seal about the peripheral edge of the transparency.

Figure 1:
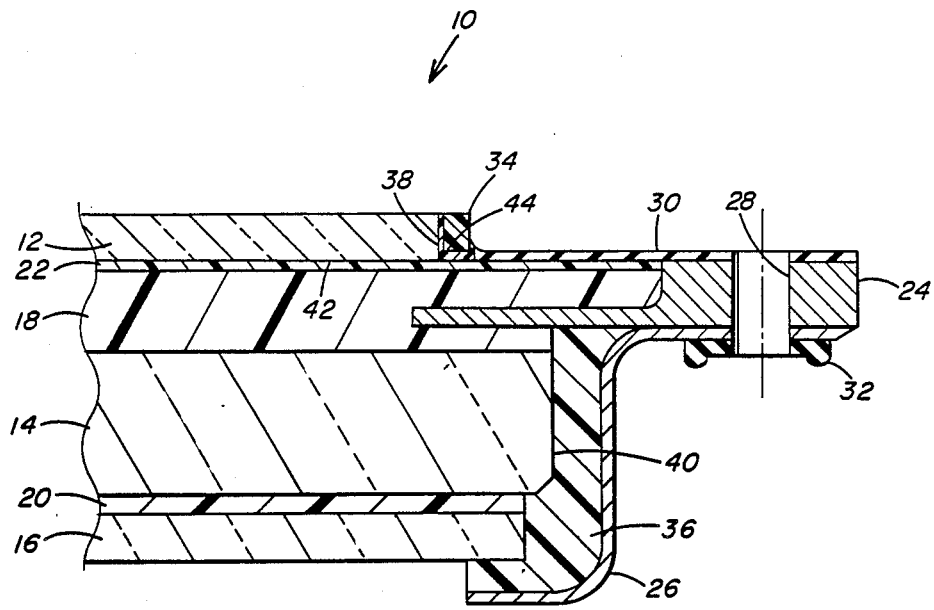
FIG. 1 is a cross-sectional view of the edge of a laminated assembly incorporating features of the present invention.

FIG. 1 illustrates a cross-sectional view of an aircraft window assembly 10 incorporating an edge seal, which is the subject of the present invention. The assembly 10 may be flat, slightly curved, or dramatically curved to form an aircraft canopy. In the particular embodiment illustrated in FIG. 1, assembly 10 is a glass laminate but it should be appreciated that it may also be, for example, a glass and plastic laminate or an all plastic laminate or include any other rigid transparent material, such as but not limited to polycarbonate or acrylic resin. Glass plies 12, 14, and 16 are bonded together by interlayers 18 and 20, which typically include one or more layers of polyvinyl butyral interlayer material. To increase the strength of the assembly 10, an interlayer 22 of urethane material similar to that disclosed in U.S. Pat. No. 3,931,113 to Seeger et al., which teachings are hereby incorporated by reference, is provided between outer glass ply 12 and interlayer 18. It should be recognized that although FIG. 1 shows a single urethane interlayer ply 22 along glass ply 12, the urethane ply 22 may be at any other location within the assembly 10, and further, additional urethane plies may be used to strengthen the assembly 10.

The assembly 10 is framed for mounting in a matching opening of an aircraft (not shown) by insert 24 and pan 26, which are made of a structurally rigid, lightweight material such as, for example aluminum, and which include an opening 28 for a bolt (not shown) to secure the assembly to the aircraft. A preformed gasket 30, preferably made of silicone or neoprene, is secured to the outer marginal area of the assembly 10, over the interlayer 22 and insert 24. Silicone gasket 32 is secured to the pan 26 to provide a pressurization seal when the assembly 10 is mounted in the aircraft. Moisture seals 34 and 36 are provided about peripheral edges 38 and 40 of the glass plies 12 and glass plies 14 and 16, respectively, to prevent moisture from entering the laminated assembly and causing edge delamination.

Silicone or polysulfide materials are typically used as the edge seal materials in an aircraft window. However, it has been found that these materials exhibit certain deficiencies when used to seal the edge of a laminated transparency, and particularly in a transparency which has a urethane interlayer ply. The sulfur in a polysulfide seal material migrates into the urethane, causing it to break down and degrade, which in turn results in edge delamination due to reduced adhesive properties. Silicone avoids sulfur attack- but is too permeable to moisture. Moisture entering the assembly 10 from the peripheral edge will cause delamination and/or electrical shorting of heating and/or static charge dissipating circuits in the assembly, and in particular to circuitry along the inner surface 42 of the outer glass ply 12.

To avoid these conditions, the present invention uses a flexible epoxy material for the edge seal 34 which will not affect the urethane interlayer 22. In one particular embodiment of the invention, the edge seal material is a flexible epoxy sealant available from BF Goodrich Company, Ohio, sold under the tradename Plastilock 425. This material is a thixotropic, two-part, lightweight, room temperature curing epoxy sealant that remains flexible down to a temperature of $-67°$ F. ($-55°$ C). This type of epoxy material is the same as that used to cast selected parts to shape and glue them to the leading edge of a wing assembly to become a structural member of the aircraft wing. Tests comparing the moisture permeability of the flexible epoxy to heat vulcanizing silicone show that the flexible epoxy is up to 80 times less permeable to moisture.

Referring to FIG. 1, the edge 38 of the glass ply 12 is preferably primed with a surface treatment 44 that conditions the surface to promote adhesion of the edge sealant. One particular type of surface treatment is a silane solution available from Products Research and Chemical Corporation, New York, and sold under the tradename PR 142.

With continued reference to FIG. 1, moisture seal 36 is preferably a polysulfide material which bonds the pan 26 to the edge 40 of the assembly 10. The polysulfide material will not degrade the assembly 10 since it will not contact an urethane interlayer. In the particular assembly configuration illustrated in FIG. 1, the polysulfide material is forced under pressure into the space between pan 26 and edge 40 and allowed to cure in situ.

Figure 2:
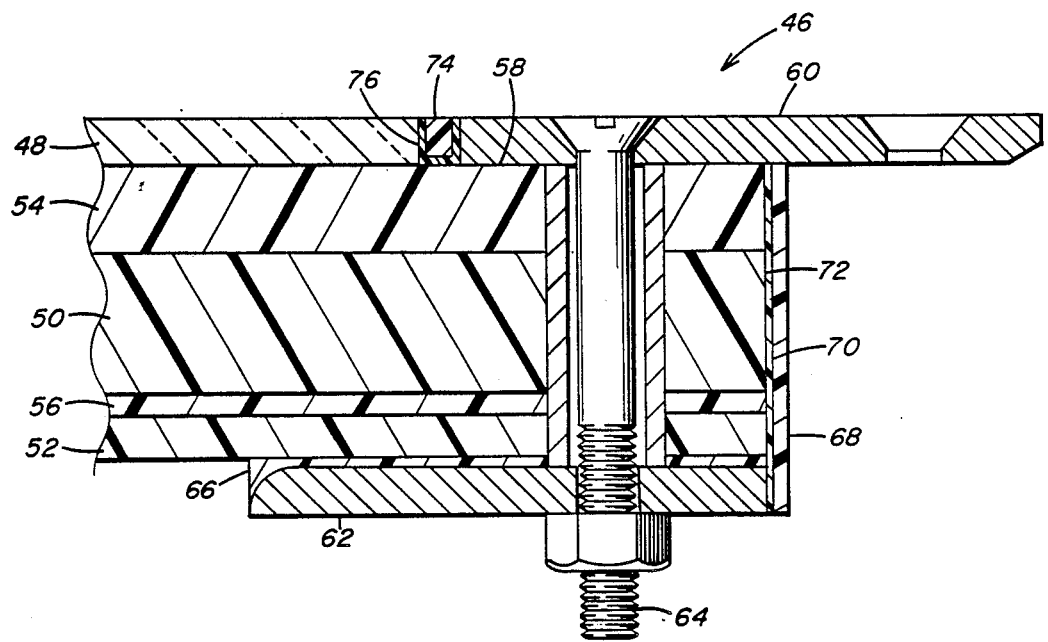
FIG. 2 is a cross-sectional view of the edge of an alternate laminated assembly incorporating features of the present invention.

FIG. 2 illustrates an alternate aircraft window assembly 46 that incorporates the flexible epoxy moisture seal as taught in the present invention. Assembly 46 includes a glass ply 48, polycarbonate plies 50 and 52 and urethane interlayers 54 and 56. Marginal edge 58 is secured between a pair of rigid outboard and inboard retainers 60 and 62, preferably aluminum, by bolt 64. An adhesive 66, such as but not limited to polysulfide or polyvinyl butyral, is used to seal the lower retainer 62 to the inboard polycarbonate ply 52. Moisture seal 68 is the flexible epoxy sealant as previously discussed. Surface treatment 70 cleans and primes edge 72 of the assembly 46 and the epoxy is applied to the edge 72 and smoothed. A bead of flexible epoxy 74 fills the space between the edge of outer glass ply 48 and the outer retainer 60 after priming by surface treatment 76 to provide an additional moisture barrier.

The form of the invention shown and described in this specification represents an illustrative preferred embodiment and it is understood that various changes may be made without departing from the spirit of the invention as defined in the following claimed subject matter.

We claim:
1. A laminated transparency comprising:
a rigid substrate;
a flexible ply secured to said rigid substrate; and
a flexible epoxy moisture sealant about the peripheral edge of said transparency.

2. The transparency as in claim 1 wherein said substrate is a first substrate and further including additional substrates secured to said flexible ply or said first substrate.

3. The transparency as in claim 2 wherein said substrates are selected from a class including glass, polycarbonate, and acrylic plastics.

4. The transparency as in claim 3 wherein said flexible ply is selected from a class including polyvinyl butyral, silicone, and urethane.

5. The transparency as in claim 4 further including a primer layer between said sealant and said peripheral edge.

6. The transparency as in claim 5 wherein said primer is a silane material.

7. The transparency as in claim 4 further including means to secure said transparency to an opening of a vehicle.

8. The transparency as in claim 7 wherein said securing means includes rigid attachment means secured about the periphery of said transparency.

9. a laminated transparency comprising:
a rigid substrate;
a urethane ply secured to said rigid substrate; and
a flexible epoxy moisture sealant about the peripheral edge of said transparency.

10. The transparency as in claim 9 wherein said substrate is a first substrate and further including additional substrates secured to said urethane ply or said first substrate.

11. The transparency as in claim 10 wherein said substrates are selected from a class including glass, polycarbonate, and acrylic plastics.

12. The transparency as in claim 11 further including a primer layer between said sealant and said peripheral edge.

13. The transparency as in claim 12 wherein said primer is a silane material.

14. The transparency as in claim 11 further including means to secure said transparency to an opening of a vehicle.

15. The transparency as in claim 14 wherein said securing means includes rigid attachment means secured about the periphery of said transparency.

* * * * *